US008251282B2

(12) United States Patent
Clark et al.

(10) Patent No.: US 8,251,282 B2

(45) Date of Patent: Aug. 28, 2012

(54) CARD READER DEVICE WITH SENSOR FOR SENSING CARD TRAPPING DEVICE

(75) Inventors: Barrie Clark, Dundee (GB); Scott L. Colston, Dundee (GB)

(73) Assignee: NCR Corporation, Duluth, GA (US)

( * ) Notice: Subject to any disclaimer, the term of this patent is extended or adjusted under 35 U.S.C. 154(b) by 1255 days.

(21) Appl. No.: 12/004,358

(22) Filed: Dec. 20, 2007

(65) Prior Publication Data

US 2009/0159687 A1 Jun. 25, 2009

(51) Int. Cl.

| | |
|---|---|
| ***G06K 5/00*** | (2006.01) |
| ***G06K 13/00*** | (2006.01) |
| ***G06K 7/00*** | (2006.01) |

(52) U.S. Cl. ......................... 235/380; 235/476; 235/486

(58) Field of Classification Search .................. 235/380, 235/476

See application file for complete search history.

(56) References Cited

U.S. PATENT DOCUMENTS

| | | | | |
|---|---|---|---|---|
| 4,358,103 | A * | 11/1982 | Koike et al. | 271/248 |
| 4,365,700 | A * | 12/1982 | Arimoto et al. | 194/206 |
| 6,729,538 | B2 * | 5/2004 | Farquhar | 235/379 |
| 2004/0208351 | A1 * | 10/2004 | Yoshida et al. | 382/137 |
| 2007/0057070 | A1 * | 3/2007 | Scarafile et al. | 235/475 |

* cited by examiner

*Primary Examiner* — Thien M. Le
*Assistant Examiner* — Toan Ly
(74) *Attorney, Agent, or Firm* — Peter H. Priest

(57) ABSTRACT

A card reader device has a card entrance for receiving a card and a card enclosure in registration with the card entrance. The card enclosure defines an area in which the card is read. The card reader also has a card transport mechanism for drawing a card into the card enclosure and for ejecting the card from the card enclosure. A sensor is provided for sensing displacement of part of the card transport mechanism in a direction transverse to the plane of transport of the card, and a control circuit ascertains if the displacement of the card transport mechanism fulfills an alarm criterion.

8 Claims, 3 Drawing Sheets

CARD READER DEVICE WITH SENSOR FOR SENSING CARD TRAPPING DEVICE

BACKGROUND

The present invention relates to a card reader device.

Card reader devices are typically used in self-service terminals, such as automated teller machines (ATMs), to enable a customer to identify himself/herself. One type of card reader device is a motorized card reader/writer (MCRW) device.

A bank customer can access funds from his/her account using an ATM card that typically has an associated personal identification number (PIN). Any customer who presents a valid ATM card and enters the correct PIN associated with that card has immediate access to funds in an account controlled by that ATM card. This makes ATM cards vulnerable to theft and to more surreptitious attacks, such as card "skimming". Skimming refers to illicit reading of a magnetic stripe on a customer's ATM card.

With the increase of integrated circuit cards, skimming may become less common because an integrated circuit cannot be read surreptitiously as easily as a magnetic stripe. This may increase the occurrence of card capture fraud at an ATM.

One method of capturing cards at an ATM is referred to as the "Algerian V" attack. It is implemented by placing a wedge of material between co-operating rollers in the card reader. By wedging the co-operating rollers open, the fraudster can prevent the card reader from ejecting an inserted card. The customer may attempt to enter his/her PIN, which the fraudster will observe. When the customer leaves the ATM (without his/her card) then the fraudster can extract the customer's card, remove the wedge, and then use the customer's card and PIN to obtain funds from the customer's account.

SUMMARY

It is an object of an embodiment of the present invention to reduce the possibility of this type of illicit card capture.

According to a first aspect of the present invention there is provided a card reader device comprising: a card entrance for receiving a card; a card enclosure in registration with the card entrance and defining an area in which the card is read; a card transport mechanism for drawing a card along a path and into the card enclosure and for ejecting the card from the card enclosure; a sensor for sensing displacement of part of the card transport mechanism in a direction transverse to the path of the card, and a control circuit for ascertaining if the displacement of the card transport mechanism fulfils an alarm criterion.

The card transport mechanism may comprise one or more co-operating rollers, stretchable endless belts, skid plates, or a combination of these.

The card reader device may be a motorized card reader device.

The alarm criterion may be based on whether the displacement exceeds a predetermined threshold. This may be obtained indirectly, for example, by ascertaining if the intensity measured by an optical sensor is below a predetermined threshold.

The predetermined threshold may be programmable or it may be fixed at manufacture of the control circuit.

The sensor and the control circuit may be retro-fitted to a card reader. Alternatively, the sensor and the control circuit may be incorporated into the design of the card reader.

The control circuit may be coupled to an alarm, so that the alarm is triggered in the event that the displacement of the card transport mechanism fulfils the alarm criterion.

The sensor for sensing displacement of the card transport mechanism may be an optical sensor comprising an optical receiver and an associated optical illumination source. The optical sensor may measure light intensity received from the optical source. The optical sensor may include an internal standard or other reference for compensating for drift due to external light sources, temperature, humidity, or other factors. Any other convenient sensing technology may be used, for example, capacitive position sensing, inductive position sensing, linear variable differential transducer sensing, Hall effect sensing, magnetic sensing, or the like.

By virtue of this aspect of the invention, a card reader device is provided that detects if its transport mechanism, or part thereof, has been deflected. This will indicate if some material has been added to inhibit the transport mechanism from transporting a card.

According to a second aspect of the present invention there is provided a method of operating a card reader device to reduce fraud, the method comprising: sensing displacement of part of a card transport mechanism in a direction transverse to a plane of transport of an inserted card, ascertaining if the sensed displacement fulfils an alarm criterion; and triggering an alarm signal in the event that the alarm criterion is fulfilled.

According to a third aspect of the present invention there is provided a self-service terminal including a card reader device according to the first aspect of the invention.

BRIEF DESCRIPTION OF THE DRAWINGS

These and other aspects of the invention will be apparent from the following specific description, given by way of example, with reference to the accompanying drawings, in which.

DETAILED DESCRIPTION

Figure 1:
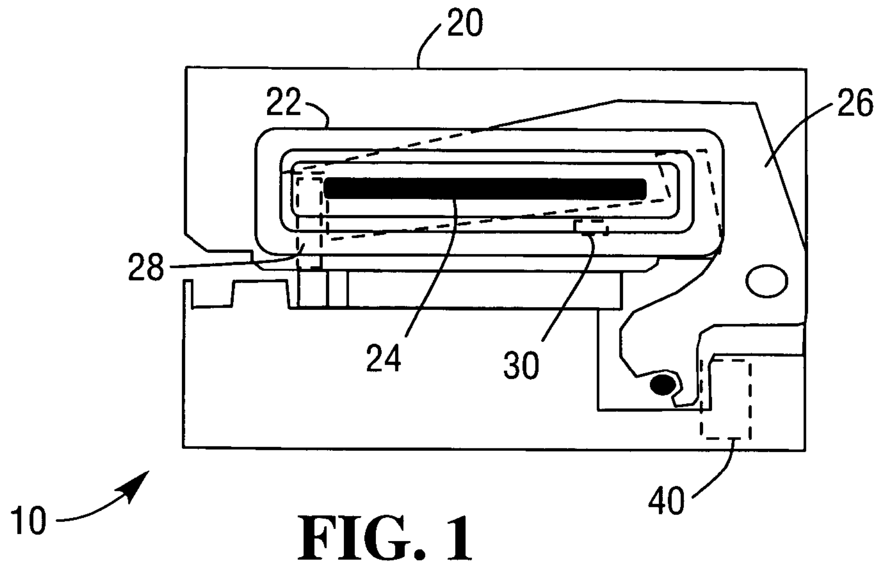
FIG. 1 is a front view of a motorized card reader device according to one embodiment of the present invention.
Figure 3:
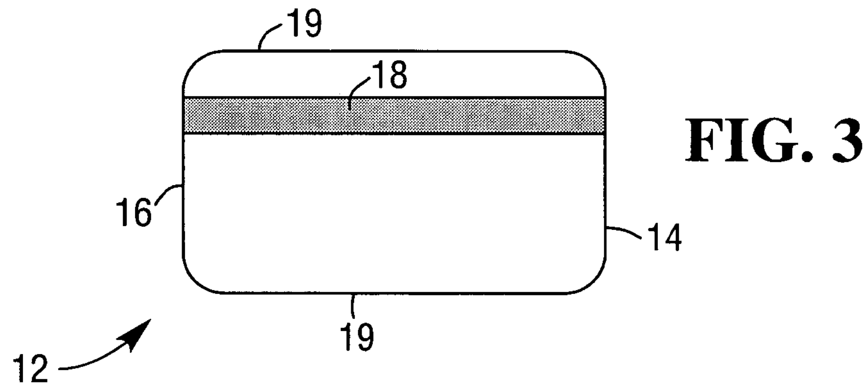
FIG. 3 is a rear view of a conventional magnetic stripe card for use with the device of FIGS. 1 and 2.

Reference is first made to FIG. 1, which is a front view of a motorized card reader device 10 (hereinafter "card reader") according to one embodiment of the present invention, and also to FIG. 2, which is a simplified side view of the card reader 10. Reference is also made to FIG. 3 which is a rear view of a conventional magnetic stripe ATM card 12 for use with the card reader 10.

The ATM card 12 comprises a leading (narrow) edge 14 opposite a trailing (narrow) edge 16, and a magnetic stripe 18 extending from the leading edge 14 to the trailing edge 16 parallel to long edges 19.

The card reader 10 comprises a card enclosure 20 (in the form of a housing) coupled to a card entrance 22 (in the form of a throat portion).

The card reader 10 is a modified version of a motorized card reader available from Sankyo Seiki (Trade Mark) at 1-17-2, Shinbashi, Minato-Ku, Tokyo, 1058633, Japan.

The throat portion 22 is conventional (unmodified) and defines a slot 24 dimensioned for receiving the ATM card 12 leading edge 14 first. The throat portion 22 also includes a shutter 26 pivotally coupled to the housing 20 for controlling access from the throat portion 22 to the housing 20.

When the shutter 26 is in the open position, a card (such as ATM card 12) may be transported from the throat portion 22 to the housing 20; whereas, with the shutter 26 in the closed position no card may pass between the throat portion 22 and the housing 20.

Once the leading edge 14 of the ATM card 12 passes the shutter 26, the shutter 26 is released and biased against the top of the ATM card 12 so that the shutter 26 automatically closes once the trailing edge 16 of the ATM card 12 clears the shutter 26.

The throat portion 22 includes two sensors for verifying that an object inserted by the customer is actually a bank or credit card. The shutter 26 is only opened if the correct signals are received from both sensors.

The first sensor 28 is a card width detection sensor 28. This sensor 28 is deflected by the ATM card 12 on insertion and ejection of the card. If a customer inserts a card into the throat portion 22 then the card width sensor 28 detects the presence of this card.

The second sensor 30 is a pre-shutter read head, in the form of a magnetic flux detector. This sensor 30 is located at a point in the card entrance 22 over which the magnetic stripe 18 of the ATM card 12 should pass. The first sensor 28 verifies that the ATM card 12 has the correct width, the second sensor 30 verifies that the ATM card 12 is correctly oriented. If both sensors 28,30 respond correctly to an inserted object (such as an ATM card 12) then the shutter 26 is opened.

The housing 20 also includes a shutter detect sensor 40 for detecting whether the shutter 26 is open or closed.

Figure 2:
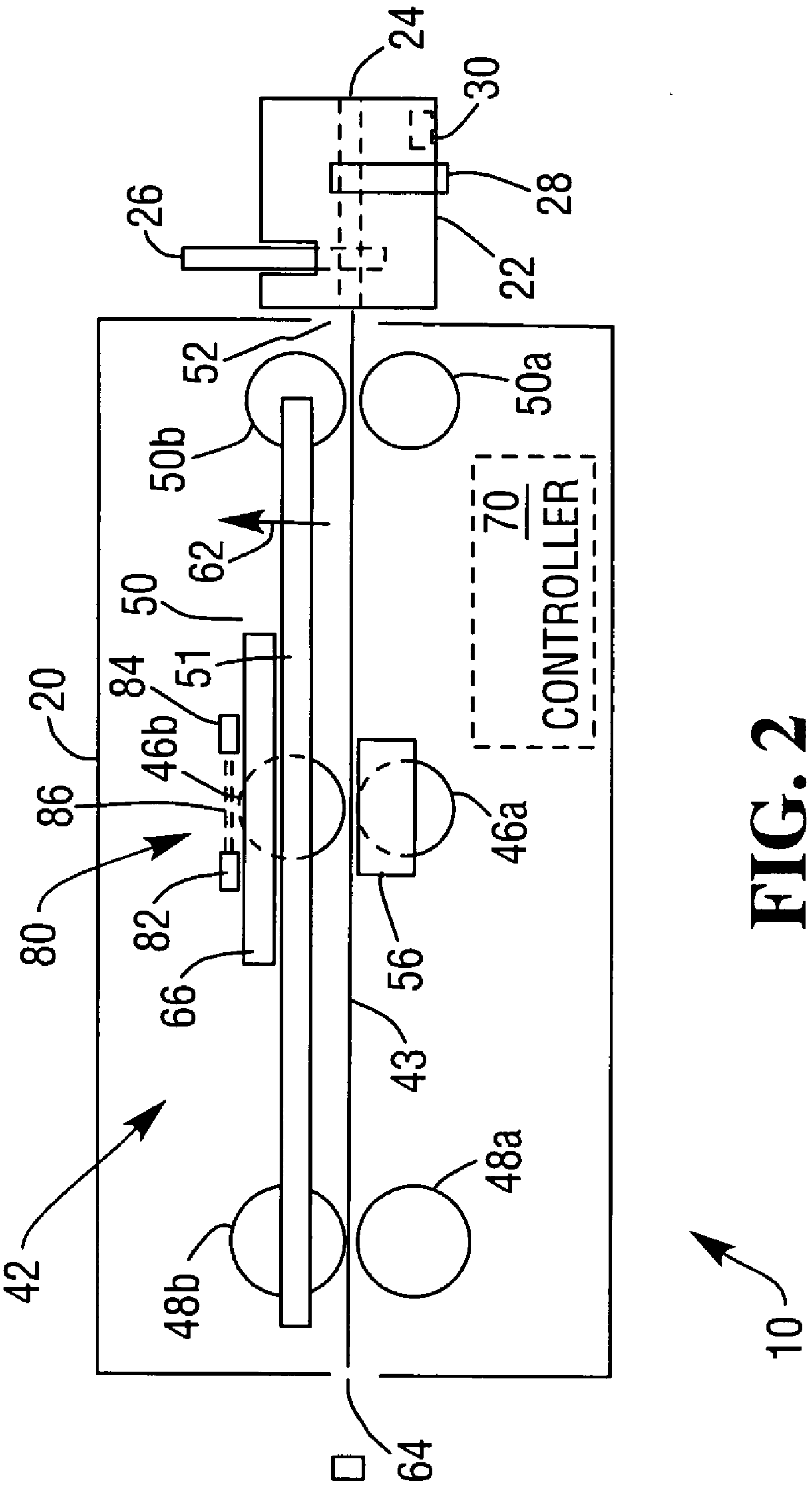
FIG. 2 is a simplified side view of the device of FIG. 1.

Referring specifically to FIG. 2, the housing 20 includes a conventional linear transport mechanism 42 for transporting the ATM card 12 along a transport path 43 when the ATM card 12 is at least partially within the housing 20.

The linear transport mechanism 42 comprises three pairs of co-operating rollers 46,48,50. For each pair of rollers, the lower roller **46*a*,48*a*,50*a* is rotated by a stretchable endless belt (not shown) driven by a motor (not shown); whereas, the upper roller 46*b*,48*b*,50*b* is an idler roller. The three idler rollers 46*b*,48*b*,50*b* are mounted on a common plate 51 resiliently biased towards the transport path 43 by a spring (not shown) to ensure that the idler rollers 46*b*,48*b*,50*b* maintain the ATM card 12 in contact with the lower rollers 46*a*,48*a*, 50*a*. The three idler rollers 46*b*,48*b*,50*b* rise and fall in unison because they are coupled by the common plate 51. Thus, if any unauthorized material is located between any of the pairs of co-operating rollers 46,48,50, (which is what typically occurs in an "Algerian V" attack) then the common plate 51** will rise.

The housing 20 defines an entrance/exit slot 52 at one end and a card retention slot 64 at the opposite end. The housing 20 also includes a card read/write head 56 for reading data from the ATM card 12 and writing data to the ATM card 12 as necessary. The housing 20 also includes multiple sensors (not shown) for accurately locating the position of the ATM card 12 within the housing 20.

A controller 70 is provided within, or coupled to, the housing 20 to control the operation of the other components of the card reader 10, such as the shutter 26, the sensors 28,30, the linear transport mechanism 42, the read/write head 56, and the like.

The common plate 51 is displaced in the direction of arrow 62 when an ATM card 12 is transported between any of the pairs of the co-operating rollers 46,48,50, and biased back to the position shown in FIG. 2 when no ATM card 12 is present between any of the pairs of the co-operating rollers 46,48,50.

A mounting plate 66 is provided above the common plate 51. The mounting plate 66 is fixed, and does not move with the common plate 51. Disposed on the top of this mounting plate 66 is a sensing arrangement 80, shown in more detail in FIG. 4, which is a block diagram thereof.

Figure 4:
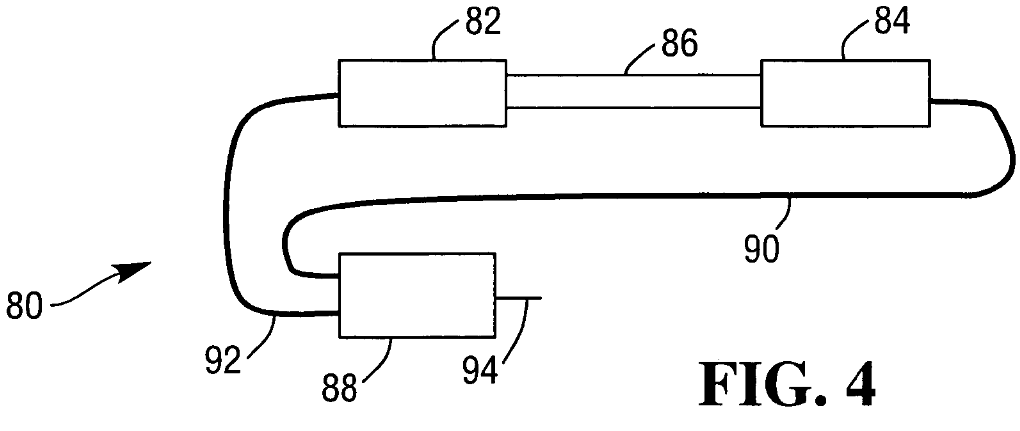
FIG. 4 is a simplified block diagram of a part (a sensor arrangement) of the device of FIG. 1.

Referring now also to FIG. 4, the sensing arrangement 80 comprises a receiver 82 (including a lens) in optical alignment with an illumination source 84 (also including a lens) so that an optical barrier 86 is provided therebetween. An optical control circuit 88 is provided that generates an illumination signal, and feeds the generated illumination signal to the illumination source 84 via an optical fiber output 90 coupled thereto. The optical control circuit 88 also receives and operates on an optical signal from the receiver 82 via an optical fiber input 92 coupled thereto. The optical control circuit 88 includes an optical amplifier and discrimination circuit (OAD circuit) and an electrical output 94 for triggering an alarm.

The OAD circuit operates on the optical signal received via the optical fiber input 92, and ascertains if an alarm criterion is fulfilled. In this embodiment, this is implemented by ascertaining if the intensity measured by the OAD circuit is below a predetermined level. If the alarm criterion is fulfilled, then the OAD circuit 88 outputs an alarm signal on electrical output 94 to trigger an alarm.

In this embodiment, the sensing arrangement 80 is designed for retro-fitting to a motorized card reader device, so the optical control circuit 88 does not have to be located within the card reader device 10.

Any convenient optical control circuit 88 may be used. In this embodiment, the optical control circuit 88 is based on a FX301H device available from SUNX (trade mark) of Kasugai, Aichi, Japan. The optical control circuit 88 is used to amplify the output of the lens 82 and to discriminate between three conditions (i) where no ATM card 12 is present, (ii) where an ATM card 12 is present, and (iii) where foreign material is present to deflect the common plate 51 to a point where an ATM card 12 could not reliably be transported. The sensing arrangement 80 is configured so that all of these three conditions can be sensed. An alarm condition is triggered when the third condition (foreign material present) is sensed, as described in more detail below.

Figure 5A:
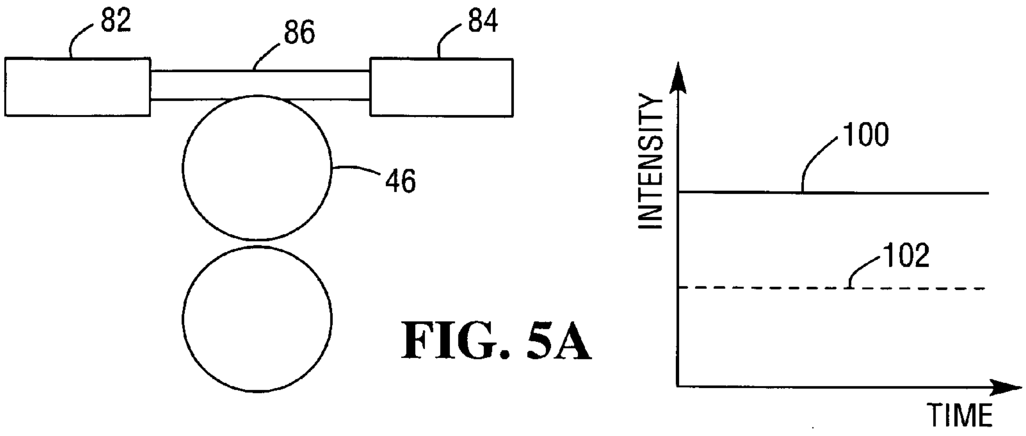
FIGS. 5A to 5C are block diagrams of part of the sensor arrangement measuring another part (an idler roller) during the operation of the device of FIGS. 1 and 2, together with graphs illustrating the measurements.

This is illustrated in FIG. 5A for the condition where no ATM card 12 is present, that is, prior to an ATM transaction. In this condition idler roller **46*b* (and therefore also the common plate 51) is not displaced because there is no ATM card 12 present beneath any of the idler rollers 46*b*,48*b*,50*b*. As a result, the top of idler roller 46*b* barely protrudes through the optical barrier 86. The measured intensity 100 is less than the maximum intensity from the illumination source 84 but much greater than the intensity for the alarm level 102**.

Figure 5B:
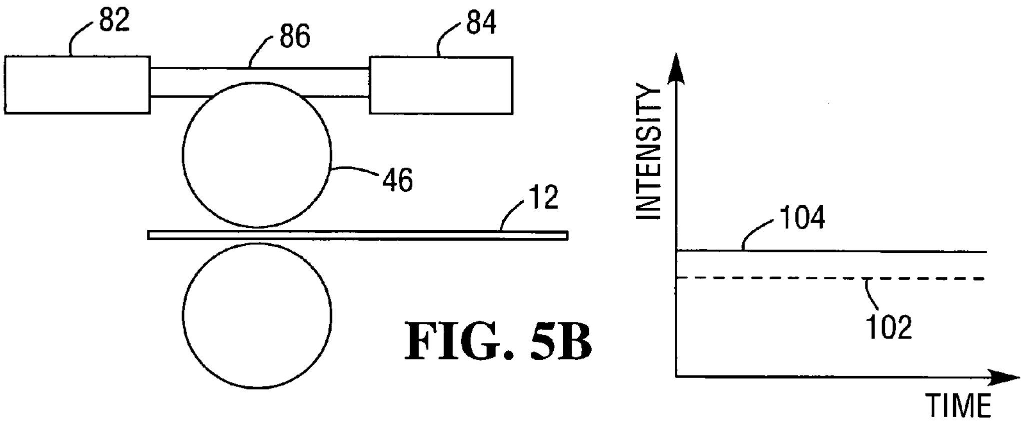

FIG. 5B illustrates the condition where an ATM card 12 is present, that is, during an ATM transaction. In this condition the idler roller 46 (and therefore the common plate 51) is raised but the optical barrier 86 is not completely blocked, so there will still be some measured intensity 104. This measured intensity 104 is greater than the intensity for the alarm level 102.

Figure 5C:
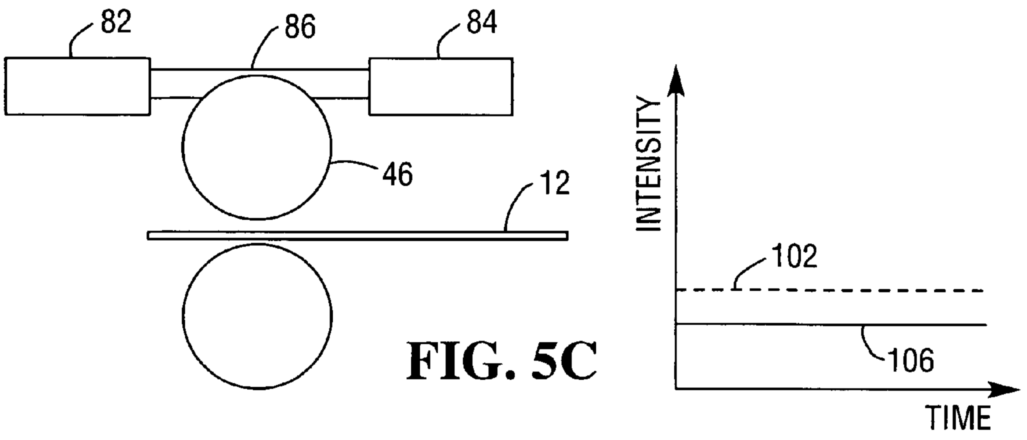

FIG. 5C illustrates the condition where the idler roller 46 (and therefore the common plate 51) is displaced beyond the normal distance when an ATM card 12 is present. This has occurred because some foreign material (such as a small wedge of plastics material) has been inserted between one of the pairs of co-operating rollers 46,48,50. As a result of the deflection of the idler roller 46, the measured intensity 106 is significantly below the intensity for the alarm level 102. This causes the sensing arrangement 80 to trigger an alarm signal, which is relayed via electrical output 94. Any device connected to this electrical output 94 (such as an ATM) can then raise an alarm, deactivate the card reader device 10, lock the shutter 26 in the closed position, or perform any other required action to ensure that a customer's card is not trapped in the card reader device 10.

It will now be appreciated that this embodiment has the advantage of reducing the possibility of a fraudster capturing a customer's card because the card reader can detect when the transport mechanism has been displaced.

This embodiment also has the advantage that it can be retro-fitted to existing card reader devices without having to change the firmware of the card reader device. The only changes required involve mounting part (or all) of the sensor arrangement 80 in the card reader device 10.

Various modifications may be made to the above described embodiment within the scope of the invention, for example, in other embodiments, the sensing arrangement may be designed as an integral part of the card reader device, so that the optical control circuit 88 may be provided by the control circuit 70, and the optical amplifier and discriminator circuit may be incorporated into the controller 70. Any alarm triggered by the sensing arrangement 80 may be relayed via a communications link from the card reader device 10.

In other embodiments, the card enclosure 20 and the card entrance 22 may be portions of a unitary device instead of being separate components coupled together.

In other embodiments, any convenient card may be read by the card reader device, such as a loyalty card, a credit card, an identification card, or the like.

In other embodiments, the sensor arrangement 80 could be mounted on any other convenient part of the card reader device 10. As all of the idler rollers 46*b*,48*b*,50*b* are connected by the common plate 51, a different idler roller 48*b*, 50*b* may be measured, or a part of the common plate 51.

In other embodiments, sensor arrangements based on different technologies than optical sensing may be used. For example, magnetic sensing, capacitive sensing, inductive sensing, or the like, may be used.

The invention claimed is:

1. A card reader device comprising:
- a card entrance for receiving a card;
- a card enclosure in registration with the card entrance and defining an area in which the card is read, the card enclosure including an entrance slot for receiving the card from the card entrance;
- a read/write head in the card enclosure;
- a card transport mechanism for drawing the card into the card enclosure through the entrance slot and along a path to the read/write head and for ejecting the card from the entrance slot, the card transport mechanism including a first pair of rollers adjacent the entrance slot and a second pair of rollers adjacent the read/write head, the first pair of rollers transporting the card to the second pair of rollers following receipt of the card and the second pair of rollers transporting the card to the first pair of rollers following reading of the card;
- a sensor for sensing displacement of a part of the card transport mechanism anywhere between the first pair of rollers and the second pair of rollers in a direction transverse to the path of the card; and
- a control circuit for ascertaining if the displacement of the part fulfills an alarm criterion indicative of both the card and a card trapping device being located on the path.

2. A card reader device according to claim 1, wherein the control circuit is operable to trigger an alarm signal when the displacement of the card transport mechanism fulfills the alarm criterion.

3. A card reader device according to claim 1, wherein the card reader device is a motorized card reader device.

4. A card reader device according to claim 1, wherein the alarm criterion is based on whether the displacement exceeds a predetermined threshold.

5. A card reader device according to claim 1, wherein the sensor comprises an optical sensor and wherein the alarm criterion is based on ascertaining if the intensity measured by an optical sensor is below a predetermined threshold.

6. A method of operating a card reader device to reduce fraud, the method comprising:
- sensing displacement of a part of a card transport mechanism in a first direction transverse to a plane of transport of an inserted card anywhere on a path between a first set of rollers at a card entrance slot and a second pair of rollers at a read/write head;
- ascertaining if the sensed displacement of the part fulfills an alarm criterion indicative of both a card and a card trapping device being located on the path; and
- triggering an alarm signal in the event that the alarm criterion is fulfilled.

7. A self-service terminal comprising:
- a card reader device comprising:
  - a card entrance for receiving a card;
  - a card enclosure in registration with the card entrance and defining an area in which the card is read, the card enclosure including an entrance slot for receiving the card from the card entrance;
  - a read/write head in the card enclosure;
  - a card transport mechanism for drawing the card into the card enclosure through the entrance slot and along a path to the read/write head and for ejecting the card from the entrance slot, the card transport mechanism including a first pair of rollers adjacent the entrance slot and a second pair of rollers adjacent the read/write head, the first pair of rollers transporting the card to the second pair of rollers following receipt of the card and the second pair of rollers transporting the card to the first pair of rollers following reading of the card;
  - a sensor for sensing displacement of a part of the card transport mechanism anywhere between the first pair of rollers and the second pair of rollers in a direction transverse to the path of the card; and
  - a control circuit for ascertaining if the displacement of the part fulfills an alarm criterion indicative of both the card and a card trapping device being located on the path; and
- a disabling circuit for disabling the card reader device when the displacement of the card transport mechanism fulfills the alarm criterion.

8. A card reader device comprising:
- a card entrance for receiving a card;
- a card enclosure in registration with the card entrance and defining an area in which the card is read;
- a card transport mechanism for drawing the card along a path and into the card enclosure and for ejecting the card from the card enclosure, the card transport mechanism including a plate extending substantially parallel to the path, an idler roller mounted to the plate, and a drive roller, the plate being normally biased in a first direction transverse to the transport path to force the idler roller against the drive roller;

a sensor for sensing displacement of the plate in a second direction opposite to the first direction when the card is located between the idler roller and the drive roller, and a control circuit for ascertaining if the displacement of the plate fulfills an alarm criterion indicative of both the card and a card trapping device being located between the idler roller and the drive roller.

* * * * *